United States Patent
Chakrabarti et al.

(10) Patent No.: US 7,368,405 B2
(45) Date of Patent: May 6, 2008

(54) PROCESS OF MAKING SILICON—SILICON CARBIDE CERAMIC USING BIOPREFORM, SILICON—SILICON CARBIDE CERAMIC OBTAINED THEREBY

(75) Inventors: Omprakash Chakrabarti, West Bengal (IN); Himadri Sekhar Maiti, West Bengal (IN); Rabindranath Mazumdar, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/334,674

(22) Filed: Dec. 30, 2002

(65) Prior Publication Data

US 2004/0135275 A1   Jul. 15, 2004

(51) Int. Cl.
   *C04B 35/565* (2006.01)
(52) U.S. Cl. .......................................... 501/88; 501/90
(58) Field of Classification Search ............ 501/88–92; 264/29.6, 29.7
   See application file for complete search history.

(56) References Cited

U.S. PATENT DOCUMENTS 4,154,787 A * 5/1979 Brown ....................... 264/101
6,124,028 A * 9/2000 Nagle et al. .............. 428/308.8
6,673,279 B2 * 1/2004 Gardner ...................... 264/29.6
2004/0126561 A1 * 7/2004 Chakrabarti et al. ..... 428/308.8

FOREIGN PATENT DOCUMENTS

DE   198 23 521 A1   3/1999
DE   198 23 507 A1   12/1999

OTHER PUBLICATIONS

Translation of abstract DE 19823507, Dec. 2, 1999.*
Lim et al "Carbonisation of Oil Palm Trunks at Moderate Temperatures" School of Physics, University Dains Malayasia, Apr. 10, 1991.*

* cited by examiner

*Primary Examiner*—Karl E Group
(74) *Attorney, Agent, or Firm*—Darby & Darby, P.C.

(57) ABSTRACT

The present invention relates to a process of making silicon-silicon carbide ceramic using biopreform derived from monocotyledonous caudex plant stem. The present invention also provides a silicon-silicon carbide ceramic made using a biopreform derived from monocotyledonous caudex plant stem.

4 Claims, No Drawings

PROCESS OF MAKING SILICON—SILICON CARBIDE CERAMIC USING BIOPREFORM, SILICON—SILICON CARBIDE CERAMIC OBTAINED THEREBY

FIELD OF THE INVENTION

The present invention relates to a process of making silicon-silicon carbide ceramic using biopreform derived from monocotyledonous caudex plant stem. The present invention also provides a silicon-silicon carbide ceramic made using a biopreform derived from monocotyledonous caudex plant stem.

BACKGROUND OF THE INVENTION

The duplex silicon (Si)-silicon carbide (SiC) ceramic, hereinafter designated as Si-SiC, shows excellent physico-chemical properties like high oxidation, corrosion and thermal shock resistance, superb high temperature strength and toughness together with other related properties, e.g., Young's modulus, hardness, etc., and therefore, is of great technological importance. These properties can be exploited during the applications of the material in the fields of kiln furniture particularly for heating sanitary wares, saggers, and crucibles for calcining fluorescent powder in fluorescent lamp industries, high speed and high service life domestic and industrial burners, rocket nozzles, recuperators for waste heat utilization in industrial furnaces, heat-exchangers for indirectly fired open/combined cycle gas turbines to generate electric power, ceramic seals for pumps handling corrosive fluids, wear inserts, etc.

SiC ceramics are fabricated from synthetic powders by hot pressing/hot isostatic pressing, pressureless sintering, polymer pyrolysis, chemical vapor deposition, liquid silicon infiltration processing (LSIP) or reaction bonding/reaction sintering. Reference is made to the Ph.D. Thesis ("Reaction sintering of silicon carbide" by O. P. Chakrabarti, University of Calcutta, 1998) and also to an article ("Reactive infiltration of Si—Mo alloyed melt into carbonaceous perform of SiC", by O. P. Chakrabarti and P. K. Das published in the J. Am. Ceram. Soc., 83[6]1548-1550 (2000)), wherein the authors present a detailed review of the different processing routes of SiC ceramics with particular emphasis on the Si or alloyed Si melt infiltration processing of Si—SiC ceramics.

The drawbacks of the referred works in the mentioned reviews, are requirement of expensive synthetic raw powders, complex preform making and difficult machinability of the finished product etc. However, synthesis of ceramic materials from naturally grown plant structures has recently received interests. Plants often possess natural composite structures and exhibit high mechanical strength, low density, high stiffness, elasticity and drainage tolerance. These advantages are because of their hierarchically built anatomy developed and optimized in a long-term genetic evolutionary process. There is a possibility of producing novel ceramic materials with a unique microstructure pseudomorphous to that of naturally grown plant structures. The bio-structure derived ceramic materials would have tailorable properties with numerous potential applications. Synthesis of SiC ceramic from naturally grown plant structures has recently received interest among the material scientists.

References is made (i) to U.S. Pat. No. 3,754,076, titled "Production of silicon carbide from rice husk" by I. Cutler, 21 Aug. 1973) and also to an article ("Formation of silicon carbide from rice hulls" by J. G. Lee and I. B. Cutler, published in the Am. Ceram. Soc. Bull., 54[2] 195-98 (1975)) wherein the authors reported the production of SiC whiskers from thermal decomposition of rice hulls, a waste product, (ii) to an article ("Formation and structure of silicon carbide whiskers from rice hulls" by N. K. Sharma, W. S. Williams and A. Zangvil, published in the J. Am. Ceram. Soc., 67[11] 715-720 (1984)) wherein the authors informed of a study relating to the distribution of silicon (Si) in hulls of common brown Indian rice, carried out to aid in understanding the formation of SiC whiskers and also of ultrafine β-SiC particles by thermal decomposition, (iii) to an article ("Growth of β-SiC whiskers by LVS process", by J. V. Milewski, F. D. Gac, J. J. Petrovic and S. R. Skaggs, published in the J. Mater. Sci., 20, 1160-1166 (1985)) wherein the authors described a vapor-liquid-solid process for the formation of the SiC whisker by the catalyzed thermal decomposition of rice husk, (iv) to Indian Patent 172941 titled "A process for the production of silicon carbide fibers (β-form) from rice husk" by M. Patel, C. B. Raiu, A. K. Ray and A. Karera, 8 Jan. 1994) and also to an article ("Effect of thermal and chemical treatments in rice husk" by M. Patel, A. Karera and P. Prasanna, published in the J. Mater. Sci, 22, 2457-2464(1987)) wherein the authors described the formation of SiC whiskers by carbonizing coked rice husk pretreated with hydroxides of metal catalysts, (v) to an article ("SiC whiskers from rice husks: role of catalysts" by M. Patel and A. Karera, published in the J. Mater. Sci. Letts., 8, 955-956 (1989)) wherein the authors describe the formation of SiC whiskers by carbonizing rice husks without added catalyst, (vi) to an article ("Direct pyrolysis of raw rice husks for maximization of SiC whisker formation" by R. V. Krishnarao and M. M. Godkhindi, M. Chakraborty and P. G. Mukunda, published in the J. Am. Ceram. Soc., 74, 2869-2875 (1991)) wherein the authors described the formation of SiC whiskers by pyrolysis of raw rice husks without any catalyst or precooking, (vii) to an article ("Conversion of raw rice husks to SiC by pyrolysis in nitrogen atmosphere" by R. V. Krishnarao, Y. R. Mahajan and T. J. Kumar, published in the J. Euro. Ceram. Soc., 18, 147-152 (1998)) wherein the authors describe the formation of SiC whiskers by pyrolysis of raw rice husks without precooking, (viii) to an article ("Synthesis and characterization of SiC whiskers from coconut shells" by A. Selvam, N. G. Nairand P. Singh, published in the J. Mater. Sci. Lett., 17, 57-60 (1998)), wherein he authors described a method of producing SiC whiskers by pyrolyzing raw coconut shells soaked with 10% ferrous chloride solution followed by drying. The drawbacks of the referred works are high pyrolysing temperature, poor yield, uneconomical conversion because of the requirement of very large pyrolysing reactor for handling voluminous assemblage of rice husk and unshaped whisker/powder which needs further processing for making shapes of controlled microstructure.

Reference is made to an article ("Biomimetic process for producing SiC wood" by T. Ota, M. Takahashi, T. Hibi, M. Ozawa, S. Suzuki and Y. Hikichi, published in the J. Am. Ceram. Soc., 78[12] 3409-11 (1995)), wherein the authors describe a method of making SiC in wood like structure by infiltrating tetra ethyl ortho silicate (TEOS) into a piece of oak charcoal followed by hydrolysis by treatment with ammoniacal solution and by heat treating the charcoal containing $SiO_2$ gel. The drawbacks of the referred work are requirement of multiple TEOS infiltration followed by subsequent firing, porous final product with unconverted carbon in the structure and incomplete conversion of C to SiC.

Reference is also made to a two-part article ("Biomorphic cellular silicon carbide ceramics from wood: I. Processing and Microstructure" by P. Greil, T. Lifka and A. Kaindl published in the J. Euro. Ceram. Soc. 18, 1961-1973 (1998) and "Biomorphic cellular silicon carbide ceramics from wood: II. Mechanical Properties" by P. Greil, T. Lifka and A. Kaindl published in the J. Euro. Ceram. Soc. 18, 1975-1983 (1998)) wherein the authors describe a method of making cellular SiC ceramics with anisotropic pore structures by infiltrating liquid silicon at 1600° C. for 4 hours without pressure into carbonized woody (beech, oak, maple, pine, balsa and ebony) specimens. Long infiltration cycle, lower product density and microstructure of the final product randomly varying with precursor wood without correlation, constitute the main drawbacks of the referred work.

Reference is made to an article ("Silicon/silicon carbide composites fabricated by infiltration of a silicon melt into charcoal" by D. W. Shin, S. S. Park, Y. H. Choa and K. Nihara, published in the J. Am. Ceram. Soc., 82[11] 3251-53 (1999)) wherein the authors describe a method of making dense Si/SiC composite by infiltrating liquid Si (obtained by melting powder Si) at 1700° C. under vacuum into porous commercial oak charcoal specimen. The drawbacks of the referred work are higher infiltration temperature and difficulty in infiltration procedure likely to be arising out of usage of powdered silicon under vacuum.

Reference is also made to U.S. Pat. No. 6,124,028, titled "Carbonized wood and materials formed therefrom" by Denis C. Nagle and Christopher E. Byrne, 26 Sep. 2000) wherein the authors described a method of making SiC ceramic by reacting stoichiometric to greater than stoichiometric quantity of silicon at 1500° C. for 10 minutes to 2 hours in flowing argon, with carbonized wood specimens (red oak, balsa, basswood, maple, white pine, red wood). The drawbacks of the referred work are incomplete infiltration, difficulty in unloading of the final product because of sticking problem and absence of correlation between the product microstructure and structure of the precursor wood.

Reference is made to an article ("Environment conscious ceramics (Ecoceramics)" by M. Singh published in Ceram. Eng. Sci. Proc., 21[4] 39-44 (2000)), wherein the author described a method of fabricating SiC-based ceramics by reactive infiltration by molten silicon at 1450° C. for 30 minutes into pyrolyzed wood specimens (Brazilian Rosewood, African Zebra, Ceylon Stainwood, African Bubinga, Pau Lope, Australian Jarrah and Indian Mango wood). The drawbacks of the referred work are long infiltration cycles required for processing the ceramic and product microstructures that vary according to the parent plant structure but remain un-correlated.

A wide variety of plants are used for making different varieties of SiC ceramics. Plant shells make possible mostly the production of SiC whiskers or fibers, but the manufacturing processes are just short of being commercially viable. Biological preforms from various naturally grown plant stems including soft woods and hard woods are employed for producing bulk SiC ceramics. In view of the variations in dimensions, compositions and morphology of the naturally grown plant structures, the shape and composition of the bulk SiC produced may vary significantly.

However no studies have been found relating to the selection of the suitability of plant structure in terms of its anatomical and structural features, which after having been transformed to carbonaceous preform, helps in faster infiltration and reaction of liquid through porous contour to get converted to SiC. No study has been done, which relates to overcome the difficulties of withdrawing infiltrated specimen form contacting liquid after the completion of the infiltration and reaction. No study is available which avoids the costly post-infiltration treatment for removal of adhered melt from product surface The present invention has been developed in view of the foregoing and other deficiencies of the prior art.

OBJECTS OF THE INVENTION

The main object of the present invention is to provide an improved process for making silicon-silicon carbide ceramic using biopreform derived from a monocotyledonous caudex plant such as coconut (*Cocos nucifera*), palmyra palm (*Borassus flabellifer*), date palm (*Phoenics dactylifera*) which obviates the drawbacks as detailed above.

Another object of the present invention is to use a biopreform made from caudex stem of a monocotyledonous plant, the carbonaceous skeletal structure of which is highly advantageous for liquid Si infiltration processing of silicon-silicon carbide ceramic in a significantly reduced processing cycle.

Still another object of the present invention is to provide a method of making Si—SiC ceramic from a biopreform following liquid silicon infiltration technique that considerably simplifies the ways of contacting silicon with the said biopreform.

Still another object of the present invention is to provide a method of making Si—SiC ceramic from a biopreform following liquid silicon infiltration technique that avoids costly instrumentation and expensive and sophisticated equipment required for making contacts between Si infiltrant and carbonaceous perform in conventional processing.

Yet another object of the present invention is to provide a method of making Si—SiC ceramic wherein the entire silicon reactant is consumed so that no solid silicon remains as leftover, thereby eliminating the sticking of final product to remaining solidified silicon melt so that no silicon adheres to the external surface of the final product, thereby eliminating the costly procedure for removal of silicon from the surfaces like, etching, high-temperature evacuation, treatment with chemicals etc.

SUMMARY OF THE INVENTION

The present invention provides an improved process for preparation of bulk Si—SiC ceramic composite following rapid infiltration of liquid silicon into biopreforms derived from stems of monocotyledonous caudex plant, such as coconut (*Cocos nucifera*), palmyra palm (*Borassus flabellifer*), date palm (*Phoenics dactylifera*).

The novelty of the present invention is that such duplex Si—SiC ceramic composite is made with maintenance of cellular features of the said biopreforms, and, hence of precursor plant, and therefore, is a completely new ceramic composite material with unique macro- and microstructural characteristics nearly isomorphous to the precursor plants.

The said biopreforms, because of having large number of smaller diameter trachaedal pore channels randomly distributed and vertically elongated, along with micropores arising out of woven microfibrils and also numerous hollow spaces originating from the leaf-trace bundles in the same direction, provides increased contour for liquid silicon infiltration and reaction, which makes it possible to produce the resulting Si/SiC composite in a significantly reduced time.

The trachaedal porosity, micropores and leaf-trace pores are finally filled up completely by residual silicon yielding numerous reinforcements randomly distributed and oriented along the growth-direction, increasing the anisotropic mechanical properties of the final material.

Accordingly the present invention provides a process for the making of a silicon-silicon carbide ceramic using a biopreform derived from monocotyledonous caudex plant stem which comprises heating together a biopreform derived from the stem of a monocotyledonous caudex plant and silicon in a crucible under vacuum at a temperature in the range of 1450° C. to 1600° C., maintaining the peak temperature for a period in the range of 2 to 4 minutes followed by furnace cooling to obtain the desired ceramic.

In one embodiment of the invention, the biopreform is derived from *Cocos nucifera, Borassus flabellifer* and *Phoenics dactylifera*.

In another embodiment of the invention, the amount of silicon taken is in the range of 5.7 to 13.0 gm for biopreform weighing in the range of 1.1 to 3.6 gm.

In another embodiment of the invention, the vacuum is maintained in the range of 1.0 mm to 0.05 mm Hg.

In another embodiment of the invention, the biopreform is obtained by preheating a piece of stem of a monocotyledonous caudex plant at a temperature in the range of 50 to 90° C., maintaining the preheated stem piece at the peak temperature, followed by heating the preheated stem piece in a closed container provided with a vent at a temperature in the range of 350 to 1000° C., maintaining the stem piece at the peak temperature under self-generated ambient atmosphere, followed by furnace cooling to obtain the biopreform.

The present invention also relates to a silicon-silicon carbide ceramic prepared by a process comprising heating together a biopreform derived from the stem of a monocotyledonous caudex plant and silicon in a crucible under vacuum at a temperature in the range of 1450° C. to 1600° C., maintaining the peak temperature for a period in the range of 2 to 4 minutes followed by furnace cooling to obtain the desired ceramic.

In one embodiment of the invention, the biopreform is derived from *Cocos nucifera, Borassus flabellifer* and *Phoenics dactylifera*.

In another embodiment of the invention, the amount of silicon taken is in the range of 5.7 to 13.0 gm for biopreform weighing in the range of 1.1 to 3.6 gm.

In another embodiment of the invention, the vacuum is maintained in the range of 1.0 mm to 0.05 mm Hg.

DETAILED DESCRIPTION OF THE INVENTION

In the process of the present invention, synthesis of this duplex non-oxide ceramic is made using infiltration of molten silicon into structured pores of a carbonaceous biopreform, which leads to the reaction of silicon (Si) with carbon (C) resulting in the formation of silicon carbide (SiC) the unreacted silicon (Si) being present in the residual porosity. The novelty of the present invention is that unlike other processes of making SiC based ceramics from biostructure derived preforms, the final material in the present case is made by an inexpensive processing route as it uses a precursor which is transformed from a plant available locally as a cheap natural or agricultural product and which is prepared from the caudex stem of a monocotyledonous tree that ultimately gives faster processing cycles. In the process of present invention of making silicon (Si)-silicon (SiC) carbide ceramic, stem of monocotyledonous caudex plant such as coconut (*Cocos nucifera*), palmyra palm (*Borassus flabellifer*), date palm (*Phoenics dactylifera*) is used to prepare the biopreform.

According to the present invention, preparation of such novel Si/SiC ceramic from the said biopreform is possible by the use of the following inventive steps:

(i) using a processed biopreform of any size and shape, derived the from the stem of a monocotyledonous caudex plant such as coconut (*Cocos nucifera*), palmyra palm (*Borassus flabellifer*), date palm (*Phoenics dactylifera*), which makes it possible to use novel processing parameters such as using a crucible of simple cylindrical shape containing an exhaustible amount of Si together with the said biopreform for infiltration and reaction at a temperature in the range of 1450 to 1600° C. under a vacuum in the range of 1.0 mm to 0.05 mm Hg, holding for a period of 2 to 4 minutes at the peak temperature, facilitating easy and instantaneous unloading of the final product.

When a porous carbonaceous preform is brought in contact with molten Si, the liquid wets the preform and penetrates into its pores. This infiltration of liquid Si is accompanied by simultaneous chemical reaction between Si and C, which is again governed by volume diffusion of Si through the solid reaction product. The reaction rate between C and Si is faster than infiltration rate. [ref "Fiber-reinforced silicon carbide", by E. Fitzer and R. Gadow, published in Am. Ceram. Soc. Bull., 65[2], 326-35, 1986]. So the infiltration times normally estimated to be very small, may not be realized in practice. The channels may become chocked off and conversion of C to SiC may not be completed. This particular problem is overcome by using the novel biopreform derived from monocotyledonous caudex plant stem. The said biopreform by virtue of its genesis and uniqueness in its method of preparation, as described in a copending patent application (entitled "A process of making biopreform from the monocotyledonous caudex plant stem suitable for liquid infiltration and gaseous transportation processing of materials" by O. P. Chakrabarti, H. S. Maiti and R. Majumdar . . . ), has numerous trachaedal channel porosity randomly distributed and elongated along the stem axis, micropores arising out of the microfibrils and hollow tubular spaces originating from the leaf-trace bundles, oriented in the same direction, which gives rise to increased volumetric flow rate for liquid Si, as per the equation [ref. "Liquid-phase reaction bonding of silicon carbide using alloyed silicon-molybdenum melt", by R. P. Messner and Y. M. Chiang, published in J. Am. Ceram. Soc. 73[5], 1193-1200, 1990]:

$$\frac{dV_{Si}}{dt} = \frac{n\pi r^4 \Delta p}{8\eta l},$$

where r is the pore radius and l the pore length, $\Delta p$ the pressure differential between the ends of the pore channels, n the number of pores and $\eta$ the viscosity of the Si melt. It may be presumed that the negative effect of the smaller pore radius towards volumetric flow rate is off-set by the increased pressure differential obtained by application of vacuum and increased number of pores/channels. The net effect is that increased rate of infiltration and reaction of liquid Si is possible into such novel biopreforms, which ultimately ends in significant reduction of the processing time of the final Si—SiC ceramic composite. Using the novel biopreform derived from the stem of a monocotyledons caudex plant for liquid Si infiltration processing in significantly reduced processing cycles, of the bulk Si—SiC ceramic with macro- and microstructural features isomorphous to the cellular structure of the parent plant, is a completely new and unique processing route with reference to the prior art.

The present invention provides a process for making silicon-silicon carbide ceramic using biopreform derived from a monocotyledonous caudex plant such as coconut (*Cocos nucifera*), palmyra palm (*Borassus flabellifer*), date palm (*Phoenics dactylifera*) which obviates the drawbacks of the prior art. The carbonaceous skeletal structure of the biopreform is highly advantageous for liquid Si infiltration processing of silicon-silicon carbide ceramic in a significantly reduced processing cycle, because of its large number of smaller trachaedal pore channels randomly distributed and vertically elongated, coupled with micropores arising out of the woven microfibrils and numerous hollow spaces originating from the leaf-trace bundles in the same direction assuring faster infiltration and reaction of molten silicon through it. The method of the invention considerably simplifies the making of Si—SiC ceramic from the said biopreform using liquid silicon infiltration technique to contact silicon with the biopreform, because of possibility of loading of reactant silicon together with the said biopreform to be infiltrated, thereby avoiding the costly instrumentation and expensive and sophisticated equipment required for making contact between Si infiltrant and carbonaceous perform in conventional processing. The reactant silicon is taken in a completely exhaustible amount so that no solid silicon remains as leftover, thereby eliminating the possibility of sticking of the final product to the remaining solidified silicon melt. No silicon adheres to the external surface of the final product, thereby eliminating the costly procedure for removal of silicon from the surfaces like etching, high-temperature evacuation, treatment with chemicals.

The method of the invention comprises heating together preferably 1.1 to 3.6 gm of a piece of biopreform derived from the stem of a monocotyledonous caudex plant such as such as coconut (*Cocos nucifera*), palmyra palm (*Borassus flabellifer*), date palm (*Phoenics dactylifera*), and preferably 5.7 to 13.0 gm of silicon in a crucible under a vacuum of 1 mm to 0.05 mm of Hg at a temperature in the range of 1450° C. to 1600° C. with a holding at the peak temperature for a period in the range of 2 to 4 minutes followed by furnace cooling.

Preparation of the bioprefonn is described in our copending application Ser. No. 10/334,676 (now abandoned in favor of application Ser. No. 11/347,602) filed on even date. For ease of reference the procedure is described briefly below.

The process of making the biopreform wherein the microstructural, structural and anatomical features of typical plant precursor are preserved comprises preheating 4 to 13.4 gm of a piece of stem of a monocotyledonous caudex plant such as coconut (*Cocos nucifera*), palmyra palm (*Borassus flabellifer*), date palm (*Phoenics dactyifera*), at a temperature in the range of 50 to 90° C. preferably using a beating rate of 1 to 10° C. per minute, holding for a period of 24 to 48 hours at the peak temperature followed by heating the said preheated specimen in a closed container provided with a vent at a temperature in the range of 350 to 1000° C. preferably using a heating rate of 1 to 15° C. per minute, holding for a period of 5 minutes at the peak temperature under self-generated ambient atmosphere followed by furnace cooling.

The preparation of a biopreform that is substantially isomorphous to the monocotyledonous caudex stem precursor and suitable for liquid infiltration and gaseous transportation processing of composite materials is possible due to:
(i) selection of stems of monocotyledonous caudex trees characterized by:
  (a) large number of smaller trachaedal channels randomly distributed and vertically elongated along the stem axis
  (b) extremely high straightness of grains and predominantly longitudinal orientation of trachaedal channels parallel to the stem axis without secondary growth due to absence of cambium
  (c) woven and ordered microfibrils surrounding and defining the conducting channels
  (d) minimized cross-walls perpendicular to the stem axis due to absence of cambium
  (e) numerous leaf-trace bundles passing singly into the stem
  (f) presence of typical mineral elements (such as silicon)
(ii) drying or preheating of the piece of stem of monocotyledonous caudex tree at low temperature using a slow heating rate
(iii) pyrolytic transformation treatment at 350 to 1000° C. under self-generated ambient atmosphere at near normal pressures using a slow heating rate.

The main purpose of drying or preheating is to eliminate moisture from the pores and micropores of the woody stem. Preheating of trachaedal channel is preferably done at a relatively lower temperature with gentle and non-aggressive heating rate of 1 to 2° C. per minute in order to preserve the original cellular structure of parent plant material in the dried wood. The selection of 65° C. as the preheating temperature, is primarily based on two facts:
(i) it is a common practice to use molten paraffin (melting at 60 to 65° C.) in histological studies (ref "Histochemistry: Theoretical and Applied", by G. Everson Pearse, Vol. I & II, 4$^{th}$ Edition, 1985, Churchil Livingstone)
(ii) plant cell nuclear materials are stable up to 65 to 70° C. (ref. "Plant Biochemistry", Ed. by James Bonner and J. E. Verner, Academic Press, 1965, pp. 49-50)

In both the cases, retention of cellular structure is achieved with high precision. The preheating is continued for a period of 24 to 48 hours for completion to obtain constant weight of the preheated product.

Thermogravimetry of dry or preheated powdered monocotyledonous caudex woody specimen indicates that pyrolytic weight loss is practically completed by 600° C. Slow heating at a rate up to 5° C. per minute, up to 750 to 800° C., of preheated monocotyledonous caudex stem specimen is done under self-generated ambient environment at near-normal pressure without vacuum or flow of inert gases (nitrogen or argon) so that
(i) pyrolysis is complete
(ii) no collapse or distortion of cellular structure takes place
(iii) no graphitization takes place
(iv) mineral residues are not converted into stable compounds, ensuring that the biological structural features of the parent plant are preserved in the resulting shape of porous carbonaceous residue—the biopreform.

Heating at lower temperatures results in incomplete pyrolysis. Heating at higher temperatures causes partial oxidation of biopreform and tends to transform the residual minerals into stable products. Higher heating rates and higher heating temperatures denature the cell structure and destroy the near-isomorphous structural features of the precursor plant in the biopreforms. Synthesis of biopreforms from stems of monocotyledonous caudex trees at lower temperatures and near-normal pressures and under self-generated ambient atmosphere, with characteristics suitable for rapid liquid infiltration or gaseous transportation processing of materials, is a new and unique method.

The biopreform obtained from monocotyledonous caudex plant stem suitable for liquid infiltration and gaseous transportation processing of materials, overcomes the drawbacks of the prior art. The pyrolytic method considerably simplifies when compared to conventional processes of making preforms from naturally grown plant structures, the production of macro- and microstructure of biopreform isomorphous to the parent plant structure with high precision because of ambient heating, lower processing temperature and shorter holding periods. The anatomical structure of the biopreform made from the caudex stem of a monocotyledonous plant is highly advantageous for liquid infiltration because of the presence of plenty of vascular bundles randomly distributed in the ground tissue, that are retained in shape with high precision on pyrolytic transformation and give increased contours, assuring faster infiltration and reaction of liquids or transportation of gases of suitable compositions.

Another significant advantage is that the biopreform is made by pyrolytic transformation from the stem of a monocotyledonous caudex plant such as coconut (*Cocos nucifera*), palmyra palm (*Borassus flabellifer*), date palm (*Phoenics dactylifera*), that are in abundance in tropical countries such as India (which is the third largest producer of coconuts in the world. The native people of India traditionally use their fruits, leaves and various parts to derive food, beverages and varieties of essential items of their livelihood. In fact, the trees indispensable parts of their social and cultural lives).

The steps of the present invention are:

(i) 1.1 to 3.6 gm of a piece of biopreform derived from the stem of a monocotyledonous caudex plant such as such as coconut (*Cocos nucifera*), palmyra palm (*Borassus flabellifer*), date palm (*Phoenics dactylifera*) was taken (ii) 5.7 to 13.0 gm of silicon was taken together with the said biopreform in a crucible (iii) It was then heated under a vacuum of 1 mm to 0.05 in of Hg at a temperature in the range of 1450° C. to 1600° C. with a holding at the peak temperature for a period in the range of 2 to 4 minutes to make the final product (iv) The final product was furnace cooled The following examples are given by way of illustration and therefore should not be construed to limit the scope of the present invention.

EXAMPLE-1

1.1 gm of a piece of crack-free, biopreform derived from coconut wood prepared in accordance with our copending application Ser. No. 10/334,676 (now abandoned in favor of application Ser. No. 11/347,602) and summarized above was taken together with 5.7 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1450° C. under a vacuum of 1 mm of Hg for a period of 4 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.32% (shrinkage), 2.56% (expansion) and 1.45% (shrinkage) along the length, width and thickness respectively, indicating near-net-shape formation of the product. The bulk density and the porosity was found to be 2.61 gm/cc and 5.92%. The product was further examined by XRD analysis and found to be containing both the Si and SiC phases.

EXAMPLE-2

3.6 gm of a piece of crack-free biopreform derived from palmyra palm wood in accordance with our copending application Ser. No. 10/334,676 (now abandoned in favor of application Ser. No. 11/347,602) and summarized above was taken together with 12.4 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1500° C. under a vacuum of 0.95 mm of Hg for a period of 2 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.40% (shrinkage), 2.44% (expansion) and 1.47% (shrinkage) along the length, width and thickness respectively, indicating near-net-shape formation of the product. The bulk density and the porosity was found to be 2.68 gm/cc and 8.41%. The product was further examined by XRD analysis and found to be containing both the Si and SiC phases.

EXAMPLE-3

2.3 gm of a piece of crack-free biopreform derived from coconut wood in accordance with our copending application Ser. No. 10/334,676 (now abandoned in favor of application Ser. No. 11/347,602) and summarized above was taken together with 13.0 gm of elemental silicon in a boron nitride coated cylindrical graphite crucible of size approximately 50 mm diameter, 5 mm thickness and 115 mm of length. The bottom of the crucible was filled with elemental silicon on which the said biopreform was piaced. The graphite crucible containing the biopreform and silicon was then heated in a commercial water jacketed furnace at a temperature of 1500° C. under a vacuum of 0.20 mm of Hg for a period of 2 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.24% (shrinkage), 2.04% (expansion) and 1.07% (shrinkage) along the length, width and thickness respectively, indicating near-net-shape formation of the product. The bulk density and the porosity was found to be 2.67 gm/cc and 2.87%. The product was further examined by XRD analysis and found to be containing both the Si and SiC phases.

EXAMPLE-4

2.3 gm of a piece of crack-free biopreform derived from coconut wood in accordance with our copending application Ser. No. 10/334,676 (now abandoned in favor of application Ser. No. 11/347,602) and summarized above was taken together with 13.0 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1500° C. under a vacuum of 0.95 mm of Hg for a period of 2 minutes. The temperatare control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.22% (shrinkage), 2.06 (expansion) % and 1.01% (shrinkage) along the length, width and thickness respectively, indicating near-net-shape formation of the product. The bulk density and the porosity was found to be 2.63 gm/cc and 4.61%. The product was further examined by XRD analysis and found to be containing both the Si and SiC phases.

EXAMPLE-5

2.2 gm of a piece of crack-free biopreform derived from coconut wood in accordance with our copending application Ser. No. 10/334,676 (now abandoned in favor of application Ser. No. 11/347,602) and summarized above was taken together with 12.2 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1600° C. under a vacuum of 0.20 mm of Hg for a period of 3 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.22% (shrinkage), 2.08% (expansion) and 1.11% (shrinkage) along the length, width and thickness respectively, indicating near-net-shape formation of the product. The bulk density and the porosity was found to be 2.72 gm/cc and 0.65%. The product was further examined by XRD analysis and found to be containing both the Si and SiC phases. Further optical microscopic studies indicated that the cellular ring structure of the biopreform has been retained with solidified pool of silicon in the void space and converted SiC in the cell wall. The microscopic examination of the polished section cut along the length of the infiltrated specimen, also revealed that the longitudinal tubular channels of vascular bundles contained solidified silicon with the converted SiC in the tube wall. That the cellular ring structure of the biopreform has been preserved with high precision in the infiltrated specimen could also be confirmed by detailed SEM examination. The presence of Si and SiC phases were also confirmed by EDXA during SEM investigation.

EXAMPLE-6

2.2 gm of a piece of crack-free biopreform derived from coconut wood in accordance with our copending application Ser. No. 10/334,676 (now abandoned in favor of application Ser. No. 11/347,602) and summarized above was taken together with 12.1 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1600° C. under a vacuum of 0.07 mm of Hg for a period of 2 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.25% (shrinkage), 2.06% (expansion) and 1.13% (shrinkage) along the length, width and thickness respectively, indicating near-net-shape formation of the product. The bulk density and the porosity was found to be 2.70 gm/cc and 2.26%. The product was further examined by XRD analysis and found to be containing both the Si and SiC phases. Further optical microscopic studies indicated that the cellular ring structure of the biopreform has been retained with solidified pool of silicon in the void space and converted SiC in the cell wall. The microscopic examination of the polished section cut along the length of the infiltrated specimen, also revealed that the longitudinal tubular channels of vascular bundles contained solidified silicon with the converted SiC in the tube wall. That the cellular ring structure of the biopreform has been preserved with high precision in the infiltrated specimen could also be confirmed by detailed SEM examination. The presence of Si and SiC phases were also confirmed by EDXA during SEM investigation.

EXAMPLE-7

2.2 gm of a piece of crack-free biopreform derived from coconut wood in accordance with our copending application Ser. No. 10/334,676 (now abandoned in favor of application Ser. No. 11/347,602) and summarized above was taken together with 11.9 gm of elemental silicon in a boron nitride coated cylindrical graphite crucible of size approximately 50 mm diameter, 5 mm thickness and 115 mm of length. The bottom of the crucible was filled with elemental silicon on which the said biopreform was placed. The graphite crucible containing the biopreform and silicon was then heated in a commercial water jacketed furnace at a temperature of 1600° C. under a vacuum of 1.00 mm of Hg for a period of 4 minutes. The temperature control was done by an infrared radiation pyrometer. The exact temperature of the crucible was measured separately with a disappearing filament type optical pyrometer through quartz window. It was then furnace-cooled to produce the final ceramic.

The product was analyzed by measurement for linear dimensions, bulk density and porosity by boiling water method. The % change of the linear dimension was found to be 1.26% (shrinkage), 2.04% (expansion) and 1.09% (shrinkage) along the length, width and thickness respectively, indicating near-net-shape formation of the product. The bulk density and the porosity was found to be 2.68 gm/cc and 3.06%. The product was further examined by XRD analysis and found to be containing both the Si and SiC phases.

The main advantages of the present invention are:

a) cheap and easily available raw materials of local/native origin and of renewable and non-polluting sources b) relative easiness in fabrication technique because of complete avoidance of complex powder processing and difficult shape making c) increased shape capability because of usage of readily machinable biopreforms d) near-net-shape formation capability e) simple and faster fabrication technique coupled with easy and instantaneous means of unloading, without requirement of costly instrumentation and expensive equipment g) less-expensive eco-friendly process

We claim:

1. A silicon-silicon carbide ceramic prepared by a process comprising:
   (i) heating together a biopreform comprising a stem of a monocotyledonous plant and silicon in a crucible under vacuum at a peak temperature in the range of 1450° C. to 1600° C.,
   (ii) maintaining the peak temperature for a period in the range of 2 to 4 minutes, and
   (iii) furnace cooling to obtain the silicon-silicon carbide ceramic.

2. A ceramic as claimed in claim 1 wherein the biopreform comprises a stem of a monocotyledonous plant selected from the group consisting of *Cocos nucifera, Borassus flabellifer* and *Phoenics dactylifera*.

3. A ceramic as claimed in claim 1 wherein the silicon is in the range of 5.7 to 13.0 gm for biopreform weighing in the range of 1.1 to 3.6 gm.

4. A ceramic as claimed in claim 1 wherein the vacuum is maintained in the range of 1.0 mm to 0.5 mm Hg.

* * * * *